United States Patent
Kang et al.

(10) Patent No.: US 10,101,489 B2
(45) Date of Patent: Oct. 16, 2018

(54) SYSTEM FOR EXPLORING UNDERGROUND GEOPHYSICAL PROPERTIES AND METHOD FOR ANALYZING UNDERGROUND GEOPHYSICAL PROPERTIES USING THE SAME

(71) Applicant: Korea Institute of Geoscience and Mineral Resources, Daejeon (KR)

(72) Inventors: Woong Kang, Daejeon (KR); Jung Ho Kim, Daejeon (KR); Myeong Jong Yi, Daejeon (KR); Nikos Papadopoulos, Daejeon (KR)

(73) Assignee: Korea Institute of Geoscience and Mineral Resources, Daejeon (KR)

( * ) Notice: Subject to any disclaimer, the term of this patent is extended or adjusted under 35 U.S.C. 154(b) by 0 days.

(21) Appl. No.: 15/521,477

(22) PCT Filed: Jun. 30, 2016

(86) PCT No.: PCT/KR2016/007082
§ 371 (c)(1),
(2) Date: Apr. 24, 2017

(87) PCT Pub. No.: WO2017/030284
PCT Pub. Date: Feb. 23, 2017

(65) Prior Publication Data
US 2018/0011212 A1 Jan. 11, 2018

(30) Foreign Application Priority Data
Aug. 14, 2015 (KR) ........................ 10-2015-0114981

(51) Int. Cl.
*G01S 13/56* (2006.01)
*G01V 3/12* (2006.01)
*G01S 13/88* (2006.01)

(52) U.S. Cl.
CPC .............. *G01V 3/12* (2013.01); *G01S 13/885* (2013.01)

(58) Field of Classification Search
CPC ................................ G01S 13/885; G01V 3/12
(Continued)

(56) References Cited

U.S. PATENT DOCUMENTS 3,745,575 A * 7/1973 Kikuchi .................. G01V 3/12
324/335
4,258,321 A * 3/1981 Neale, Jr. ................. G01V 3/12
324/334

(Continued)

FOREIGN PATENT DOCUMENTS

KR     10-2002-0085209 A    11/2002
KR        10-0365141 B1     12/2002
(Continued)

OTHER PUBLICATIONS

International Search Report PCT/ISA/210 for International Application No. PCT/KR2016/007082 dated Oct. 18, 2016.
(Continued)

*Primary Examiner* — Marcus E Windrich
(74) *Attorney, Agent, or Firm* — Harness, Dickey & Pierce, P.L.C.

(57) ABSTRACT

The present invention relates to an apparatus and method for analyzing underground geophysical properties using the principle of a ground-penetrating radar. In order to resolve problems of the ground-penetrating radar (GPR) techniques of the related art which mainly acquires an underground image using electric field reflected waves and excludes acquisition of an underground image using magnetic field reflected waves, the present invention provides a system for exploring underground geophysical properties and a method for analyzing underground geophysical properties using the
(Continued)

same, the system including: a transmission antenna which is located in a specific spot on the ground and radiates an electromagnetic pulse signal; and a pair of reception antennae which measures an electric field signal and a magnetic field signal which are generated by the radiated signal, in which the system is configured to be able to acquire not only underground images using electric field reflected waves as in technology of the related art but also underground images using magnetic field reflected waves, thereby exploring underground geophysical properties more accurately and effectively than conventional technology.

6 Claims, 3 Drawing Sheets

(58) Field of Classification Search
USPC .......................................................... 342/22
See application file for complete search history.

(56) References Cited

U.S. PATENT DOCUMENTS

| | | | | |
|---|---|---|---|---|
| 4,706,031 | A * | 11/1987 | Michiguchi | G01S 7/411 |
| | | | | 324/326 |
| 6,741,201 | B1 * | 5/2004 | De Jongth | G01V 3/12 |
| | | | | 342/22 |
| 8,120,362 | B2 | 2/2012 | Combee | |
| 2008/0185903 | A1 * | 8/2008 | Bausov | E21C 27/24 |
| | | | | 299/1.2 |
| 2010/0001735 | A1 * | 1/2010 | Combee | E21B 49/02 |
| | | | | 324/344 |
| 2012/0256777 | A1 * | 10/2012 | Smith | G01S 7/412 |
| | | | | 342/22 |
| 2013/0222172 | A1 * | 8/2013 | Sentelle | G01S 13/888 |
| | | | | 342/22 |
| 2014/0002292 | A1 * | 1/2014 | Knierim | G01S 13/885 |
| | | | | 342/22 |
| 2014/0125509 | A1 * | 5/2014 | Stolarczyk | G01S 7/35 |
| | | | | 342/22 |
| 2014/0159938 | A1 * | 6/2014 | Shipley | G01V 3/12 |
| | | | | 342/22 |
| 2014/0232585 | A1 * | 8/2014 | Richardson | G01V 3/12 |
| | | | | 342/22 |
| 2015/0123835 | A1 * | 5/2015 | Sokolowsky | G01V 3/38 |
| | | | | 342/22 |
| 2015/0268218 | A1 * | 9/2015 | Troxler | G01S 13/0209 |
| | | | | 342/21 |

FOREIGN PATENT DOCUMENTS

| | | |
|---|---|---|
| KR | 10-0847772 B1 | 7/2008 |
| KR | 10-0945362 B1 | 3/2010 |
| KR | 10-1241313 B1 | 3/2013 |
| KR | 10-1267017 B1 | 5/2013 |
| KR | 10-1267016 B1 | 6/2013 |

OTHER PUBLICATIONS

Korean Office Action for Korean Application No. 10-2015-0114981 dated Aug. 27, 2015.

\* cited by examiner

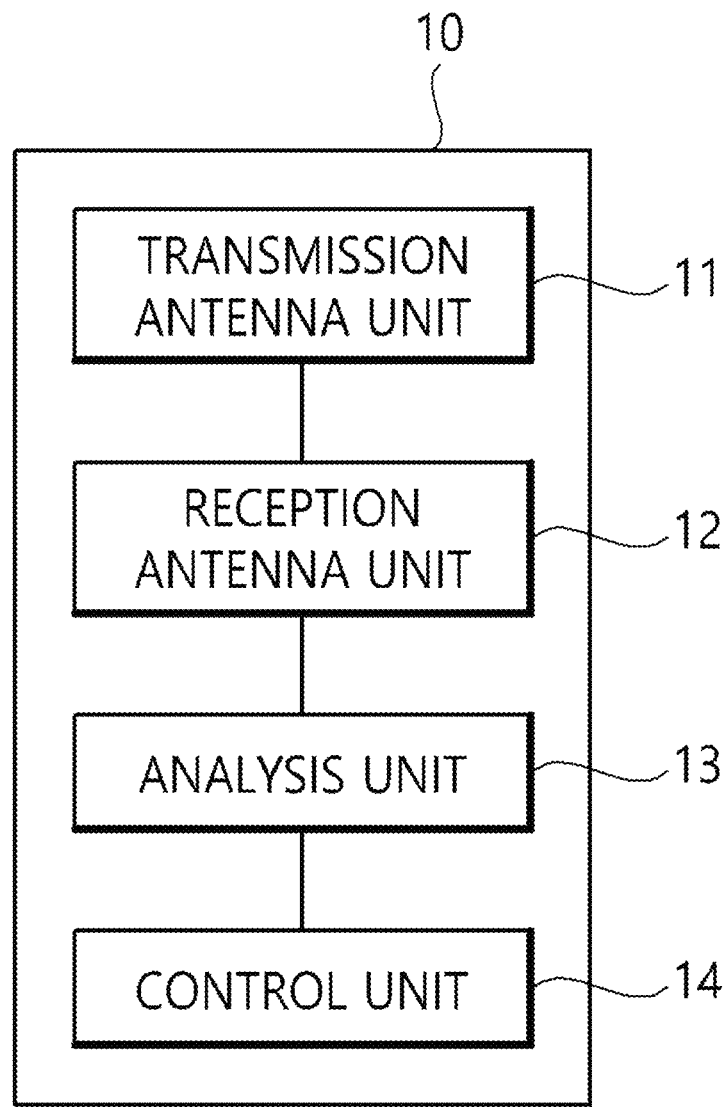
【Figure 1】

[Figure 2]
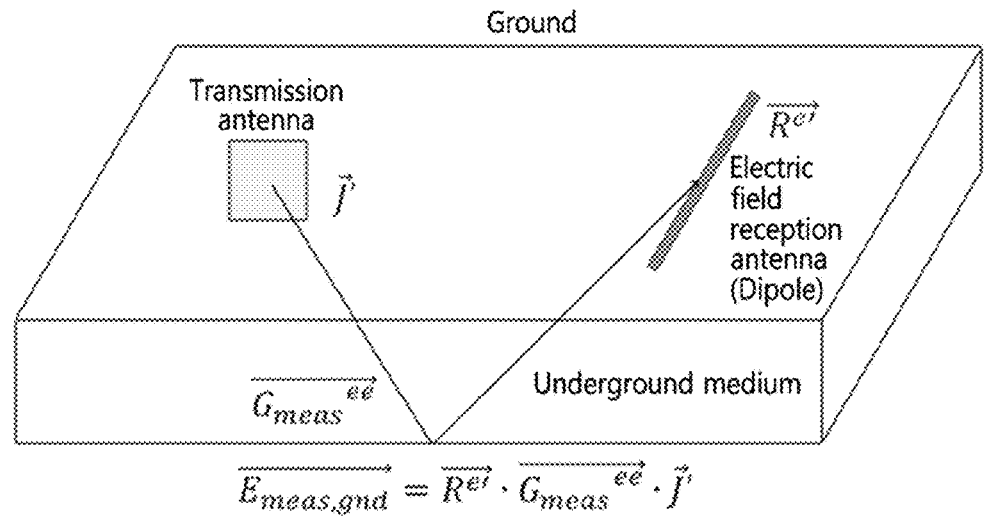
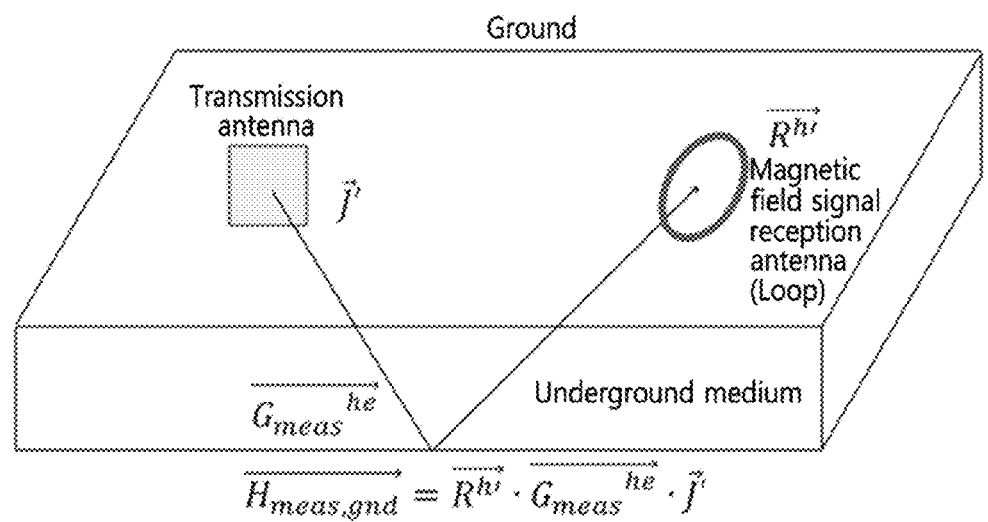

[Figure 3]
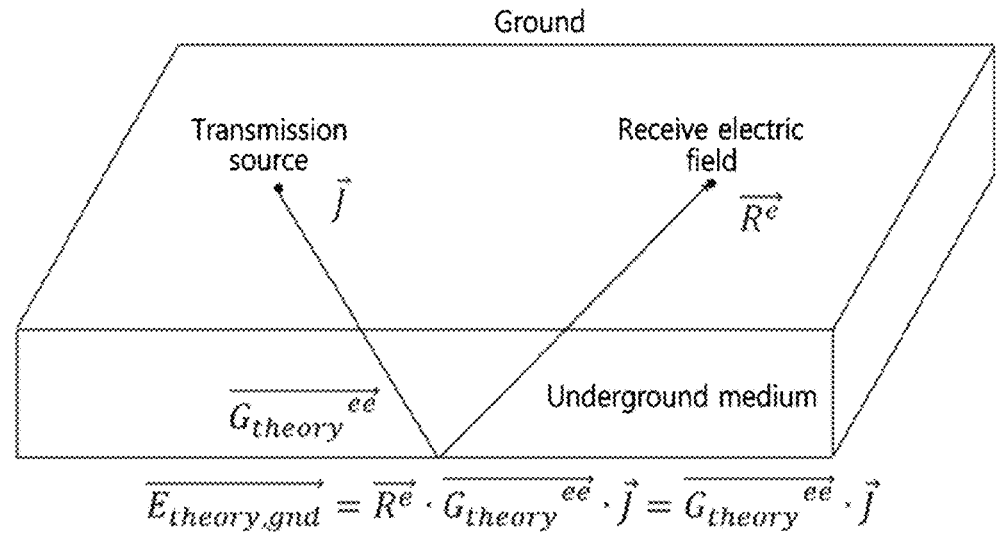
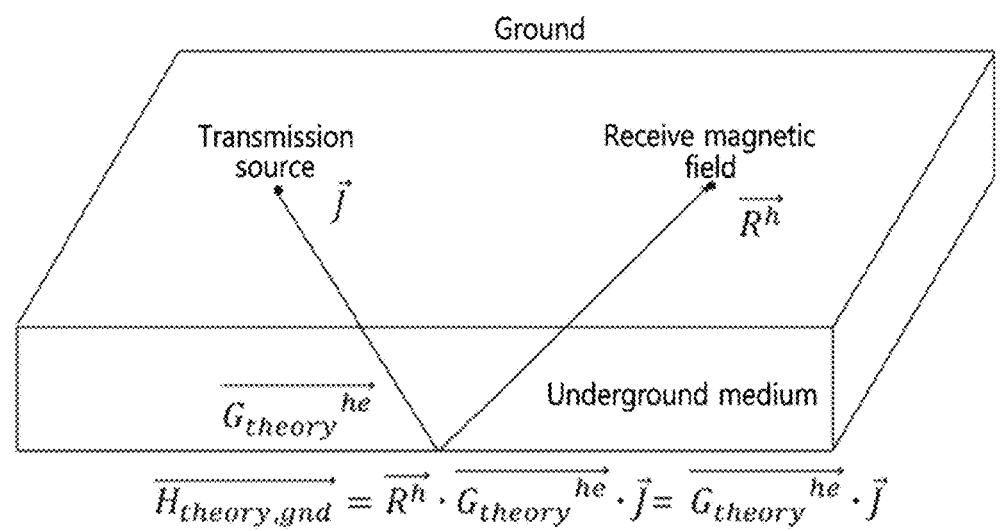

SYSTEM FOR EXPLORING UNDERGROUND GEOPHYSICAL PROPERTIES AND METHOD FOR ANALYZING UNDERGROUND GEOPHYSICAL PROPERTIES USING THE SAME

TECHNICAL FIELD

The present invention relates to an apparatus and method for analyzing underground geophysical properties using a principle of a ground penetrating radar, and more particularly, to a system for exploring underground geophysical properties and a method for measuring underground geophysical properties using the same which are configured to resolve the problems of radar exploring techniques using a underground exploring radar or ground-penetrating radar of the related art which mainly use a dipole type sensor of transmitting and receiving an electric field signal and but exclude a loop or coil type sensor of transmitting and receiving a magnetic field signal so that only a underground image using an electric field reflected wave is obtained but a underground image using a magnetic field reflected wave is not obtained.

Further, the present invention relates to a system for exploring underground geophysical properties and a method for analyzing the underground geophysical properties using the same. In order to resolve the problems of the GPR exploring techniques of the related art which mainly receive the electric field signal, but exclude the magnetic field signal as described above, the system is configured to include a transmission antenna which is located in a specific spot on the ground and radiates an electromagnetic pulse signal and a pair of reception antennae which measure an electric field signal and a magnetic field signal which are generated by the radiated signal, so that both an electric field signal reception sensor and a magnetic field signal reception sensor are operated to measure underground responses of not only the electric field but also the magnetic field to obtain not only underground images using the electric field reflected waves of the related art but also the underground images using the magnetic field reflected waves, thereby exploring underground geophysical properties more accurately and effectively than the related art.

BACKGROUND ART

In the related art, generally, as a technique for exploring and analyzing underground geophysical properties, a radar exploring technique which transmits and receives an electromagnetic wave to explore the underground geophysical properties and an electromagnetic (EM) induction exploring technique which explores the underground geophysical properties using a magnetic field have been widely used.

More specifically, the radar exploring technique is a method to explore the underground geophysical properties by transmitting and receiving an electric field signal of approximately 100 MHz to 1 GHz. The electromagnetic induction technique is a method to explore the underground geophysical properties by transmitting and receiving a magnetic field signal of several kHz or lower.

Further, recently, a so-called GPR technique which uses an underground exploring radar or a ground penetrating radar (GPR) to explore the underground geophysical properties by transmitting and receiving an electric field signal is being widely used.

Here, as an example of the related art of the apparatus and method for exploring the underground using the GPR as described above, for example, Korean Registered Patent Publication No. 10-1267017 suggests an underground facility survey system by signal processing of GPR exploration apparatus which is configured to be mounted on a cart to improve mobility so that fatigue of an operator is reduced and configured to attach antennae below the cart at the front side and the rear side to be close to the ground surface thereby minimizing the transmission and reception signal loss and suppressing the electromagnetic wave from being dissipated in the air.

Further, as another example of the related art of the apparatus and method for exploring the underground using the GPR as described above, for example, Korean Registered Patent Publication No. 10-1267016 suggests a signal interpreting apparatus of an underground facility survey by using a GPR system which is configured to more accurately survey using a ultra broadband pulse and easily move an interface for every module, survey in the scene, and move the equipment, and enable a survey speed of 4 km/day, so as to improve a working efficiency through compact integration and considerably reduce the cost.

Furthermore, as still another example of the related art of the apparatus and method for exploring the underground using the GPR as described above, for example, Korean Registered Patent Publication No. 10-1241313 suggests a system and a method using underground exploration radar for diagnosing the safety of a paved road, capable of simultaneously sensing an underground cavity existing under the paved road and the thickness of the paved road at a high speeds, the system including a low frequency radar module which generates and radiates a low frequency band pulse signal and obtains a response signal reflected from a underground cavity formed below a paved road, a plurality of high frequency radar modules which generates and radiates a high frequency band pulse signal and obtains a response signal reflected from a recognizer configured by a metal wire mesh between an intermediate layer and a base layer and between the base layer and a soil layer of the paved road, and an image processing device which displays a signal obtained from the low frequency radar module and the high frequency radar module.

Furthermore, as still another example of the related art of the apparatus and method for exploring the underground using the GPR as described above, for example, Korean Registered Patent Publication No. 10-0365141 suggests detection techniques for the survey of buried structures using a GPR system which is configured to include radiating a pulse generated in a control device through a transmission and reception antenna and receiving a signal reflected from a buried object after passing through a medium, recording and storing a signal transmitted from the reception antenna to transmit data to a CPU required for data processing in the room, determining various variables required to survey such as an initial time when the signal is recorded in the control device, a digital sampling interval of a reception signal which is an analog signal, an entire time range when the signal is recorded, and the number of stacking, generating and amplifying a transmission and reception pulse suitable for the determined variable and then radiating the transmission and reception pulse through the transmission antenna, determining a sampling interval and a sampling interval and the number of sampling per trace, implementing pulse data obtained in the control device as an image and applying various implementation colors to a high resolution screen for the processed data to represent a cross-section with a high resolving power.

As described above, even though various techniques for the devices and methods for exploring the underground using a GPR of the related art have been suggested, the devices and methods for exploring the underground using a GPR of the related art have the following problems.

That is, according to a structure in which a sensor radiates, such as a GPR, since an dipole antenna which is a radiator with a small and simple structure and has a less difference in radiation patterns according to the change of frequency is more useful than a loop type antenna, in the related art, generally, a dipole sensor is mainly used for the GPR to transmit and receive an electric field signal.

In contrast, for the electromagnetic (EM) induction which uses a lower frequency band than that of the GPR, in the electromagnetic induction range, a sensor is very small as compared with the wavelength so that the loop type is relatively more advantageous to adjust the impedance than the dipole type. Therefore, a loop and coil type sensor is mainly used as a sensor which transmits and receives a magnetic field signal.

That is, in the GPR techniques of the related art, as described above, because of the characteristics, it is advantageous to use the dipole sensor, so that only an underground image using an electric field reflected wave is mainly acquired and acquisition of an underground image using a magnetic field reflected wave is relatively excluded.

Therefore, in order to accurately and effectively explore and investigate underground geophysical properties, it is desirably to obtain both an underground image by an electric field signal and an underground image by a magnetic field signal to comprehensively analyze the signals.

Accordingly, as described above, in order to resolve the problems of the GPR exploring techniques of the related art which use only the electric field signal, but exclude the magnetic field signal, it is desirable to provide a underground geophysical property exploring system and method with a new configuration which is configured to obtain not only a underground image using the electric field reflected wave but also an underground image using a magnetic field reflected wave by operating both the electric field signal reception sensor and the magnetic field signal reception sensor. However, a device or a method which satisfies the above-mentioned requirements has not yet been provided.

RELATED ART DOCUMENT

1. Korean Registered Patent Publication No. 10-1267017 (May 16, 2013)
2. Korean Registered Patent Publication No. 10-1267016 (May 16, 2013)
3. Korean Registered Patent Publication No. 10-1241313 (Mar. 3, 2013)
4. Korean Registered Patent Publication No. 10-0365141 (Dec. 4, 2002)

DISCLOSURE

Technical Problem

The present invention has been made in an effort to solve the problems of the related art as described above. Therefore, an object of the present invention is to provide an underground geophysical property exploring system and an underground geophysical property analyzing method using the same which are configured to obtain not only an underground image using an electric field reflected wave of the related art but also an underground image using a magnetic field reflected wave by operating both an electric field signal reception sensor and a magnetic field signal reception sensor in order to resolve the problems of the ground penetrating radar (GPR) exploring techniques of the related art which mainly use a dipole sensor of transmitting and receiving an electric field signal but excludes a loop or coil type sensor of transmitting and receiving a magnetic field signal to mainly acquire an underground image using an electric field reflected wave but relatively exclude acquisition of an underground image using a magnetic field reflected wave.

Another object of the present invention is to provide a system for exploring underground geophysical properties and a method for analyzing underground geophysical properties using the same which are configured to include a transmission antenna which is located in a specific spot on the ground to radiate an electromagnetic pulse signal and a pair of reception antennae which measure an electric field signal and a magnetic field signal which are generated by the radiated signal, to measure underground responses of not only the electric field but also the magnetic field, thereby exploring underground geophysical properties more accurately and effectively than the related art, in order to resolve the problems of the GPR exploring techniques of the related art which mainly acquire an underground image using an electric field reflected wave but relatively exclude acquisition of an underground image using a magnetic field reflected wave as described above.

Technical Solution

In order to achieve the above object, an exemplary embodiment of the present invention provides an underground geophysical property exploring system for resolving problems of the ground-penetrating radar (GPR) techniques of the related art which mainly acquire an underground image using an electric field reflected wave but relatively exclude acquisition of an underground image using a magnetic field reflected wave. The system includes a transmission antenna unit including at least one transmission antenna which is provided on the ground of a specific spot which is determined in advance for an area to be explored to radiate an electromagnetic wave pulse signal; a reception antenna unit including at least one pair of an electric field signal reception antenna and a magnetic field signal reception antenna which measures electric field and magnetic field signals formed by the radiated signal of the transmission antenna unit; an analysis unit which analyzes geophysical properties of an underground medium based on the signal collected by the transmission antenna unit and the reception antenna units; and a control unit which controls an entire operation of the exploring system, in which not only the underground image using the electric field reflected wave of the related art but also an underground image using the magnetic field reflected wave are acquired by operating both the electric field signal reception sensor and the magnetic field signal reception sensor to more accurately and effectively analyze the geophysical properties of the underground medium.

Any antennae which radiate a ultra broadband electric wave pulse may be used as the transmission antenna of the transmission antenna unit.

Further, the electric field signal reception antenna of the reception antenna unit may be configured by a dipole antenna in which two conductive radiators are configured in parallel with respect to a power feeding point to receive the ultra broadband pulse signal.

Furthermore, the magnetic field signal reception antenna of the reception antenna unit may be configured by a loop antenna around which a single conductive radiator is wound to receive the ultra broadband pulse signal.

Further, when the transmission antenna is provided on the ground and the electric field and the magnetic field formed by the electromagnetic wave signal radiated from the transmission antenna are received on the same spot by the electric field signal reception antenna and the magnetic field signal reception antenna, and the electric field $\vec{e}$ and the magnetic field $\vec{h}$ by the single transmission source which are obtained by the theoretical modeling is represented by the following Equation.

$$\vec{e} = \vec{r^e} \otimes \vec{g^{ee}} \otimes \vec{j}, \vec{h} = \vec{r^h} \otimes \vec{g^{he}} \otimes \vec{j}$$

(Here, $\vec{j}$ is a single electromagnetic wave transmission source in the theoretical modeling, $\vec{g}$ represents an underground geophysical property system characteristic as an impulse response in the theoretical modeling, $\vec{r^e}$ is a reception function of the electric field signal reception antenna in the theoretical modeling, and $\vec{r^h}$ is a reception function of the magnetic field signal reception antenna in the theoretical modeling), the above Equation is Fourier transformed in the frequency domain to be transformed into the following Equation, and $$\vec{E} = \vec{R^e}\vec{G^{ee}}\vec{J}, \vec{H} = \vec{R^h}\vec{G^{he}}\vec{J}$$

a ratio of the electric field and the magnetic field is calculated using the following Equation, $$\vec{Z} = \vec{E}/\vec{H} = (\vec{R^e}\vec{G^{ee}})/(\vec{R^h}\vec{G^{he}})$$

so that the transmission signal $\vec{J}$ is eliminated from the response signal $\vec{Z} = \vec{E}/\vec{H}$ and even though the transmission signal is distorted at the time of measurement, the full waveform inversion result is not affected, to obtain a highly accurate inversion result as compared with the GPR technique of the related art.

Further, when an electric field signal and a magnetic field signal by radiation of a single transmission antenna are measured in an air medium by reception antennae in the same spot spaced apart from the transmission antenna ($\overrightarrow{E_{meas,air}}$ and $\overrightarrow{H_{meas,air}}$) and a ratio $|\overrightarrow{E_{air}}|/|\overrightarrow{H_{air}}|$ of the intensities of the electric field and the magnetic field in the air is defined as an intrinsic impedance ($\eta_o \approx 377\Omega$), the following Equation is used to calculate a calibration function $\overrightarrow{f(\omega)}$ which calibrates the ratio of the electric field signal and the magnetic field signal received by the antennae of the reception antenna unit based on the intrinsic impedance so that when the antennae of the transmission antenna unit and the reception antenna unit are used in the vacuum or air to obtain the electric field signal and the magnetic field signal, the ratio has a constant characteristic regardless of the frequency.

$$\overrightarrow{f(\omega)} = \frac{\eta_o}{\overrightarrow{E_{meas,air}}/\overrightarrow{H_{meas,air}}} = \frac{\overrightarrow{R^{h'}}}{\overrightarrow{R^{e'}}}$$

(Here, $\overrightarrow{R^{h'}}$ and $\overrightarrow{R^{e'}}$ are reception functions of the magnetic field signal receiver and the electric field signal receiver obtained by measurement, respectively).

Further, a processing for obtaining the calibration function may be performed on other medium than the air by the same method, so that the calibration function is used in combination even for two or more types of media.

Furthermore, the transmission antenna may be located on the ground rather than in the air, and the electric field signal and the magnetic field signal which are radiated by the transmission antenna may be measured by the electric field signal reception antenna and magnetic field signal reception antenna, respectively, at the same spot on the ground which is located in the different spot from the transmission antenna, so that in addition to the electric field response corresponding to the GPR image of the related art, measurement data for the magnetic field response and the magnetic field image is acquired.

When the transmission antenna is provided on the ground to measure the electric field signal and the magnetic field signal, if the characteristics of the reception antennae are compensated by the calibration function ($\overrightarrow{f(\omega)}$), the ratio ($\overrightarrow{R^{e'}}/\overrightarrow{R^{h'}}$) of the receiver function by the measurement is eliminated, so that the geophysical properties of the underground medium by the measurement may be obtained using the following Equation.

$$\overrightarrow{Z_{meas,gnd}} = \frac{\overrightarrow{E_{meas,gnd}}}{\overrightarrow{H_{meas,air}}} \cdot \overrightarrow{f(\omega)} = \frac{\overrightarrow{R^{e'}} \cdot \overrightarrow{G_{meas}^{ee}}}{\overrightarrow{R^{h'}} \cdot \overrightarrow{G_{meas}^{he}}} \cdot \frac{\overrightarrow{R^{h'}}}{\overrightarrow{R^{e'}}} = \frac{\overrightarrow{G_{meas}^{ee}}}{\overrightarrow{G_{meas}^{he}}}$$

(Here, $\overrightarrow{G_{meas}^{ee}}/\overrightarrow{G_{meas}^{he}}$ indicate a geophysical property system of the underground medium obtained by the measurement).

Furthermore, another exemplary embodiment of the present invention provides an underground geophysical property analyzing method which resolves problems of the ground-penetrating radar (GPR) techniques of the related art which mainly acquires an underground image using electric field reflected waves and excludes acquisition of an underground image using magnetic field reflected waves, in which the above-described underground geophysical property exploring system is used to measure and analyzes the underground geophysical properties, so as to be able to acquire not only underground images using electric field reflected waves as in technology of the related art but also underground images using magnetic field reflected waves, thereby measuring and analyzing more accurately and effectively the geophysical properties of the underground medium as compared with the GPR technique of the related art.

Advantageous Effects

As described above, according to the present invention, an underground geophysical property exploring system and an underground geophysical property analyzing method using the same which are configured to acquire not only an underground image using an electric field reflected wave of the related art but also an underground image using a magnetic field reflected wave by operating both an electric field signal reception sensor and a magnetic field signal reception sensor are provided, thereby solving the problems of the ground penetrating radar (GPR) exploring techniques of the related art which mainly use a dipole type sensor of transmitting and receiving an electric field signal but excludes a loop or coil type sensor of transmitting and receiving a magnetic field signal to mainly acquire an underground image using an electric field reflected wave but relatively exclude acquisition of an underground image using a magnetic field reflected wave.

Further, according to the present invention, in order to resolve the problems of the ground penetrating radar (GPR) exploring techniques of the related art which mainly acquire an underground image using an electric field reflected wave but relatively exclude acquisition of an underground image using a magnetic field reflected wave, a system for exploring underground geophysical properties and a method for analyzing underground geophysical properties using the same. The system is configured to include a transmission antenna which is located in a specific spot on the ground to radiate an electromagnetic pulse signal and a pair of reception antennae which measure an electric field signal and a magnetic field signal which are generated by the radiated signal, to measure underground responses of not only the electric field but also the magnetic field are provided, thereby exploring underground geophysical properties more accurately and effectively than the related art.

DESCRIPTION OF DRAWINGS

FIG. 1 is a block diagram schematically illustrating an entire configuration of an underground geophysical property exploring system according to an exemplary embodiment of the present invention.

FIG. 2 is a conceptual view schematically illustrating a process of measuring and analyzing geophysical properties for an underground medium using an underground geophysical property exploring system according to an exemplary embodiment of the present invention illustrated in FIG. 1.

FIG. 3 is a conceptual view schematically illustrating a process of measuring and analyzing geophysical properties for an underground medium by theoretical modeling.

BEST MODE

Hereinafter, specific exemplary embodiments of an underground geophysical property exploring system and an underground geophysical property analyzing method using the same according to the present invention will be described with reference to the accompanying drawings.

Here, it should be noted that the following description is merely one exemplary embodiment to carry out the present invention, but the present invention is not limited to the exemplary embodiments which will be described below.

Further, it should be noted that in the following description of the exemplary embodiment of the present invention, when it is determined that a portion is the same as or similar to those of the related art or easily understood and carried out by those skilled in the art, detailed description thereof will be omitted for simplifying the description.

That is, as it will be described below, the present invention relates to an underground geophysical property exploring system and an underground geophysical property measuring method using the same which are configured to obtain not only an underground image using an electric field reflected wave of the related art but also an underground image using a magnetic field reflected wave by operating both an electric field signal reception sensor and a magnetic field signal reception sensor in order to resolve the problems of the ground penetrating radar (GPR) exploring techniques of the related art which mainly use a dipole type sensor of transmitting and receiving an electric field signal but exclude a loop or coil type sensor of transmitting and receiving a magnetic field signal to mainly acquire an underground image using an electric field reflected wave but relatively exclude acquisition of an underground image using a magnetic field reflected wave.

Further, as it will be described below, in order to resolve the problems of the ground penetrating radar (GPR) exploring techniques of the related art which mainly acquire an underground image using an electric field reflected wave but relatively exclude acquisition of an underground image using a magnetic field reflected wave, the present invention relates to a system for exploring underground geophysical properties and a method for analyzing underground geophysical properties using the same. The system is configured to include a transmission antenna which is located in a specific spot on the ground to radiate an electromagnetic pulse signal and a pair of reception antennae which measure an electric field signal and a magnetic field signal which are generated by the radiated signal, to measure underground responses of not only the electric field but also the magnetic field are provided, thereby exploring underground geophysical properties more accurately and effectively than the related art.

Continuously, an underground geophysical property exploring system and an underground geophysical property analyzing method using the same according to the present invention will be specifically described with reference to the drawings.

First, referring to FIG. 1, FIG. 1 is a block diagram schematically illustrating an entire configuration of an underground geophysical property exploring system according to an exemplary embodiment of the present invention.

As illustrated in FIG. 1, in order to analyze underground geophysical properties using a underground radar exploring principle such as ground-penetrating radar (GPR), the underground geophysical property exploring system 10 according to an exemplary embodiment of the present invention may be mainly configured to include a transmission antenna unit 11 including at least one transmission antenna which is located in a specific spot on the ground to radiate an electromagnetic wave pulse signal, a reception antenna unit 12 including at least one pair of an electric field signal reception antenna and a magnetic field signal reception antenna for measuring electric field and magnetic field signals formed by the radiated signal of the transmission antenna unit 11, an analysis unit 13 which analyzes geophysical properties of an underground medium based on the signal collected by the transmission antenna unit 11 and the reception antenna units 12, and a control unit 14 which controls an entire operation of the transmission antenna unit 11, the reception antenna unit 12, and the exploring system 10.

Here, in the above-described reception antenna unit 12, the electric field signal reception antenna which measures an electric field may be configured to be a dipole antenna type in which two conductive radiators are configured in parallel with respect to a power feeding point.

Further, in the above-described reception antenna unit 12, the electric field signal reception antenna which measures an electric field may be configured such that an impedance is charged in a part or all of an arm of the antenna to increase a resolution of a reception signal.

Further, in the above-described reception antenna unit 12, the magnetic field signal reception antenna which measures a magnetic field may be configured to be a loop antenna type around which a single conductor radiator is wound.

Moreover, in the above-described reception antenna unit 12, the magnetic field signal reception antenna which measures a magnetic field may be configured such that an impedance having a predetermined value is charged in a single spot of the antenna or an impedance having a constant value is charged in a plurality of sections.

Further, in the above-described transmission antenna unit 11, it should be noted that the transmission antenna which radiates an electric wave pulse signal may be configured by one of the above-described antennae, but is not necessarily limited to the above-described configuration and any antenna which may radiate an ultra broadband electromagnetic wave pulse may be used.

Moreover, the underground geophysical property exploring system 10 according to an exemplary embodiment of the present invention may be configured to have a calibration function to allow a ratio when antennae of the transmission antenna unit 11 and the reception antenna unit 12 are used in vacuum or air to acquire the electric field and magnetic field signals to have a constant property regardless of the frequency.

Continuously, as described above, a specific process of measuring and analyzing geophysical properties for an underground medium using the underground geophysical property exploring system according to an exemplary embodiment of the present invention configured as described above will be described.

That is, referring to FIG. 2, FIG. 2 is a conceptual view schematically illustrating a process of measuring and analyzing geophysical properties for an underground medium using an underground geophysical property exploring system 10 according to an exemplary embodiment of the present invention illustrated in FIG. 1.

Further, referring to FIG. 3, FIG. 3 is a conceptual view schematically illustrating a process of measuring and analyzing geophysical properties for an underground medium by theoretical modeling.

Here, in FIG. 2, $\vec{J'}$ is a transmission source signal which is radiated by the transmission antenna at the time of measurement, $\vec{R^{e'}}$ is a receiver function of an electric field signal reception antenna at the time of measurement, $\vec{R^{h'}}$ is a receiver function of a magnetic field signal reception antenna at the time of measurement, $\overline{\vec{E_{meas,gnd}}}$ and $\overline{\vec{H_{meas,gnd}}}$ are an electric field and a magnetic field (measurement values) by the transmission source signal, and $\overline{\vec{G_{meas}^{ee}}}$ and $\overline{\vec{G_{meas}^{he}}}$ are underground geophysical property systems obtained by measurement, respectively.

Further, in FIG. 3, $\vec{J}$ is directly applied as a transmission source signal in the theoretical modeling without using an antenna, $\vec{R^e}$ is an electric field signal receiver function in the theoretical modeling but is ignored because there is no antenna. Further, $\vec{R^h}$ is a magnetic field signal receiver function in the theoretical modeling but is ignored because there is no antenna. $\overline{\vec{E_{theory,gnd}}}$ and $\overline{\vec{H_{theory,gnd}}}$ are electric field and magnetic field (theoretical modeling values) and $\overline{\vec{G_{theory}^{ee}}}$ and $\overline{\vec{G_{theory}^{he}}}$ indicate the underground geophysical property systems acquired by the theoretical modeling, respectively.

More specifically, as illustrated in FIG. 2, according to the process of measuring and analyzing geophysical properties of the underground medium using the underground geophysical property exploring system 10 according to an exemplary embodiment of the present invention, first, the transmission antenna is provided on the ground and the electric field and the magnetic field formed by the electromagnetic wave signal radiated from the transmission antenna are received on the same spot by the electric field signal reception antenna and the magnetic field signal reception antenna, respectively.

In this case, according to a convolutional earth model, the electric field and the magnetic field $\vec{e}$ and $\vec{h}$ by the single transmission source which are obtained by the theoretical modeling may be represented by the following Equation 1.

$$\vec{e} = \vec{r^e} \otimes \vec{g^{ee}} \otimes \vec{j}, \vec{h} = \vec{r^h} \otimes \vec{g^{he}} \otimes \vec{j} \qquad \text{[Equation 1]}$$

Here, in Equation 1, $\vec{j}$ is a single electromagnetic wave transmission source in the theoretical modeling, $\vec{g}$ represents an underground geophysical property system characteristic as an impulse response in the theoretical modeling. Further, $\vec{r^e}$ is a reception function of the electric field signal reception antenna in the theoretical modeling and $\vec{r^h}$ is a reception function of the magnetic field signal reception antenna in the theoretical modeling.

Further, when Equation 1 is Fourier transformed in the frequency domain, Equation 1 is transformed into the following Equation 2.

$$\vec{E} = \vec{R^e} \vec{G^{ee}} \vec{J}, \vec{H} = \vec{R^h} \vec{G^{he}} \vec{J} \qquad \text{[Equation 2]}$$

Therefore, a ratio of the electric field and the magnetic field is calculated to be represented by Equation 3 so that a term of the transmission source is eliminated.

$$\vec{Z} = \vec{E}/\vec{H} = (\vec{R^e} \vec{G^{ee}})/(\vec{R^h} \vec{G^{he}}) \qquad \text{[Equation 3]}$$

Here, the inversion problem is a common interpretation goal of the earth geophysical exploration and obtains a response due to the geophysical property distribution of the underground medium and calculates an unknown underground medium geophysical property distribution from the response.

Among these, a full waveform inversion of the GPR exploring data is a technique that identifies electrical conductivity and permittivity distribution which are underground geophysical properties while updating the geophysical property (the electrical conductivity and permittivity) of the underground medium by an iterative method so as to minimize a residual between the measured radar exploring data and theoretical exploring data simulated through numerical modeling.

The above-described full waveform inversion algorithm compares the entire waveforms of the measured data and the theoretical modeling data so that a huge amount of calculation and computer resources are necessary.

Further, an important prerequisite of the full waveform inversion is that theoretical modeling data and measuring data for calculating the residual need to be results obtained when the same transmission source is used.

That is, in other words, in order to apply the full waveform inversion, a time domain signal of a transmission source which is actually radiated onto the underground needs to be known or accurately estimated.

However, in the GPR application, an electromagnetic wave pulse signal which is a transmission source is generally applied to a specific point as it is in the simulation, but the pulse signal is fed to the transmission antenna and then radiated by the antenna in the measurement. Therefore, the pulse signal is inevitably distorted according to a characteristic of the transmission antenna, an electric characteristic of the ground surface, a combined state of the transmission antenna and the ground surface, and the like.

Therefore, in the GPR technique of the related art, it is very difficult to estimate an accurate waveform of a transmission source. Further, since the transmission source in the actual measurement does not match the transmission source in the theoretical modeling, the reliability of residual is inevitably lowered.

However, as described above, according to the exemplary embodiment of the present invention, when the GPR response corresponding to a ratio between the electric field and the magnetic field is obtained, as represented in Equation 3, the transmission signal $\vec{J}$ is eliminated from the response signal $\vec{Z}=\vec{E}/\vec{H}$. Therefore, at the time of measurement, even though the transmission signal is distorted due to the transmission antenna, the underground geophysical properties, the combined state between the antenna and the ground surface, and the like, the full waveform inversion result is not affected so that a highly accurate inversion result may be obtained.

In this case, in any of the theoretical modeling and actual measurement, when the electric field and the magnetic field signals are received, respectively, the same transmission source needs to be applied to the same transmission antenna.

Continuously, an operation of a transmitting and receiving antenna of a underground geophysical analyzing method using the underground geophysical exploring system 10 according to an exemplary embodiment of the present invention configured as described above will be described.

First, an electric field signal $\vec{E}_{meas,air}$ and a magnetic field signal $\vec{H}_{meas,air}$ by radiation of a single transmission antenna are measured in an air medium by reception antennae in the same spot spaced apart from the transmission antenna.

In this case, a ratio $|\vec{E}_{air}|/|\vec{H}_{air}|$ of the intensities of the electric field and the magnetic field in the air is an intrinsic impedance and is defined as $\eta_o \approx 377\Omega$.

Therefore, as represented in the following Equation 4, a calibration function (assumed as $\vec{f(\omega)}$) which calibrates the ratio of the electric field and the magnetic field received by the reception antennae may be obtained using the intrinsic impedance.

$$\vec{f(\omega)} = \frac{\eta_o}{\vec{H}_{meas,air}/\vec{H}_{meas,air}} = \frac{\vec{R^{h'}}}{\vec{R^{e'}}} \quad \text{[Equation 4]}$$

Here, in Equation 4, $\vec{R^{h'}}$ and $\vec{R^{e'}}$ indicate reception functions of the magnetic field and electric field signal receivers by the measurement, respectively.

Further, the calibration function which is obtained during the above-described process may be obtained in other medium (for example, water) than air by the same method. Further, the obtained calibration function may be used in combination even for two or more types of media.

Here, the above-described process is a process at the time of measurement, but in the theoretical modeling, the electric field and the magnetic field are directly calculated without using the transmission and reception antennae, so that the ratio $|\vec{E}_{theory,air}|/|\vec{H}_{theory,air}|$ of the intensities of the electric field and the magnetic field in the air may be directly obtained as $\eta_o \approx 377\Omega$ without using the calibration function.

Further, separately from the above described process, the transmission antenna is located on the ground rather than in the air, and the electric field signal $\vec{E}_{meas,gnd}$ and the magnetic field signal $\vec{H}_{meas,gnd}$ are measured by the electric field signal and magnetic field signal reception antennae, respectively, at the same spot on the ground which is located in the different spot from the transmission antenna.

By doing this, two types of underground responses, that is, the electric field response (for example, a GPR image of the related art) and the magnetic field response which is enabled by the present invention or measurement data of an image may be acquired.

Here, at the time of measurement on the ground, when the characteristics of the reception antennae are compensated by the calibration function $\vec{f(\omega)}$, the ratio $\vec{R^{e'}}/\vec{R^{h'}}$ of the receiver function measured in Equation 3 is eliminated. As a result, as represented in Equation 5, $f(\omega)\ \vec{E}_{meas,gnd}/\vec{H}_{meas,gnd}$ becomes the underground medium geophysical property system $\vec{G}_{meas}^{ee}/\vec{G}_{meas}^{he}$ by the measurement.

$$\vec{Z}_{meas,gnd} = \frac{\vec{E}_{meas,gnd}}{\vec{H}_{meas,air}} \cdot \vec{f(\omega)} = \frac{\vec{R^{e'}} \cdot \vec{G}_{meas}^{ee}}{\vec{R^{h'}} \cdot \vec{G}_{meas}^{he}} \cdot \frac{\vec{R^{h'}}}{\vec{R^{e'}}} = \frac{\vec{G}_{meas}^{ee}}{\vec{G}_{meas}^{he}} \quad \text{[Equation 5]}$$

In contrast, in the theoretical modeling, the electric field and the magnetic field are directly calculated without using the transmission and reception antennae, so that as represented in Equation 6, $\vec{E}_{gnd}/\vec{H}_{gnd}$ which is obtained through the theoretical modeling without using a calibration function becomes the underground medium geophysical system $G_{theory}^{ee}/G_{theory}^{he}$ as it is by the theoretical modeling.

$$\vec{Z}_{theory,gnd} = \frac{\vec{E}_{theory,gnd}}{\vec{H}_{theory,air}} = \frac{\vec{G}_{theory}^{ee}}{\vec{G}_{theory}^{he}} \quad \text{[Equation 6]}$$

Therefore, an iterative method is performed so as to minimize a residual between a measured value and a theoretical modeling value of the ratio of the electric field and the magnetic field obtained as described above so that the full waveform inversion is performed to identify the underground geophysical property medium system.

As described above, the underground geophysical property exploring system according to the present invention and the underground geophysical property analyzing method using the same may be implemented.

As described above, the underground geophysical property exploring system and an underground geophysical property analyzing method using the same according to the present invention are implemented. Therefore, according to the present invention, an underground geophysical property exploring system and an underground geophysical property analyzing method using the same which are configured to obtain not only an underground image using an electric field reflected wave of the related art but also an underground image using a magnetic field reflected wave by operating both an electric field signal reception sensor and a magnetic field signal reception sensor and an underground geophysical property analyzing method using the same are provided, thereby solving the problems of the ground penetrating radar (GPR) exploring techniques of the related art which mainly use a dipole type sensor of transmitting and receiving an electric field signal but excludes a loop or coil type sensor of transmitting and receiving a magnetic field signal to mainly acquire an underground image using an electric field reflected wave but relatively exclude acquisition of an underground image using a magnetic field reflected wave.

Further, according to the present invention, in order to resolve the problems of the ground penetrating radar (GPR) exploring techniques of the related art which mainly acquire an underground image using an electric field reflected wave but relatively exclude acquisition of an underground image using a magnetic field reflected wave from obtaining, the underground geophysical property exploring system and an underground geophysical property analyzing method using the same are provided. The system is configured to include a transmission antenna which is located in a specific spot on the ground to radiate an electromagnetic pulse signal and a pair of reception antennae which measure an electric field signal and a magnetic field signal which are generated by the radiated signal, to measure underground responses of not only the electric field but also the magnetic field, thereby exploring underground geophysical properties more accurately and effectively than the related art.

As described above, the underground geophysical property exploring system according to the present invention and the underground geophysical property analyzing method using the same have been described in detail. However, the present invention is not limited to the above-described exemplary embodiments. Therefore, it is obvious that the present invention may be changed, modified, combined, or replaced by those skilled in the art in various ways depending on a design necessity and other various factors.

DESCRIPTION OF MAIN REFERENCE NUMERALS OF DRAWINGS

10: Underground geophysical property exploring system
11: Transmission antenna unit
12: Reception antenna unit
13: Analysis unit
14: Control unit

The invention claimed is:

1. An underground geophysical property exploring system comprising:
at least one transmission antenna configured to radiate an electromagnetic wave pulse signal;
at least one pair of an electric field signal reception antenna and a magnetic field signal reception antenna, the electric field signal reception antenna configured to measure an electric field signal generated by the electromagnetic wave pulse signal radiated from the transmission antenna, the magnetic field signal reception antenna configured to measure a magnetic field signal generated by the electromagnetic wave pulse signal radiated from the transmission antenna;
an analysis unit configured to analyze geophysical properties of an underground medium based on the electric field signal measured by the electric field signal reception antenna and the magnetic field signal measured by the magnetic field signal reception antenna; and
a control unit configured to control an entire operation of the system, wherein when the transmission antenna is provided on ground, and the electric field signal reception antenna and the magnetic field signal reception antenna receive the electric field and the magnetic field generated by the electromagnetic wave pulse signal radiated from the transmission antenna, respectively, the electric field $\vec{e}$ and the magnetic field $\vec{h}$ is represented by Equation (1) below, $$\vec{e} = \vec{r^e} \otimes \vec{g^{ee}} \otimes \vec{j}, \vec{h} = \vec{r^h} \otimes \vec{g^{he}} \otimes \vec{j} \qquad (1)$$

(Here, $\vec{j}$ represents the electromagnetic wave pulse signal, $\vec{g}$ represents an underground geophysical property system characteristic as an impulse response, $\vec{r^e}$ represents a reception function of the electric field signal reception antenna, and $\vec{r^h}$ represents a reception function of the magnetic field signal reception antenna), the Equation (1) is Fourier transformed in a frequency domain to be Equation (2) below, $$\vec{E} = \vec{R^e}\vec{G^{ee}}\vec{J}, \vec{H} = \vec{R^h}\vec{G^{he}}\vec{J} \qquad (2), \text{ and}$$

a ratio of the electric field and the magnetic field is calculated using Equation (3) below, $$\vec{Z} = \vec{E}/\vec{H} = (\vec{R^e}\vec{G^{ee}})/(\vec{R^h}\vec{G^{he}}) \qquad (3), \text{ and}$$

wherein when the electric field signal and the magnetic field signal generated by the electromagnetic wave pulse signal radiated from the transmission antenna are measured in air by the electric field signal reception antenna and the magnetic field signal reception antenna, and a ratio $|\vec{E_{air}}|/|\vec{H_{air}}|$ of intensities of the electric field and the magnetic field in the air is defined as an intrinsic impedance, a calibration function $\vec{f(\omega)}$ is calculated based on the intrinsic impedance using equation (4) below and is used to calibrate the ratio of the intensities of the electric field signal and the magnetic field signal to have a constant property regardless of a frequency when the transmission antenna, the electric field signal reception antenna, and the magnetic field signal reception antenna are used in vacuum or in the air, $$\vec{f(\omega)} = \frac{\eta_o}{\vec{E_{meas,air}}/\vec{H_{meas,air}}} = \frac{\vec{R^{h'}}}{\vec{R^{e'}}}, \qquad (4)$$

(Here, $\vec{R^{h'}}$ represents a reception function of the magnetic field signal reception antenna, $\vec{R^{e'}}$ represents a reception function of the electric field signal reception antenna, and $\eta_o$ represents the intrinsic impedance).

2. The system according to claim 1, wherein the transmission antenna is an antenna configured to radiate an ultra broadband electric wave pulse.

3. The system according to claim 1, wherein the electric field signal reception antenna is configured as a dipole antenna, in which two conductive radiators are disposed in parallel with respect to a power feeding point to receive an ultra broadband pulse signal.

4. The system according to claim 1, wherein the magnetic field signal reception antenna is configured as a loop antenna around which a single conductive radiator is wound to receive an ultra broadband pulse signal.

5. The system according to claim 1, wherein the system is configured to obtain the calibration function with regard to a medium other than the air using the the equation (4).

6. The system according to claim 1, wherein the geophysical properties of the underground medium are obtained using Equation (5), $$\overrightarrow{Z_{meas,gnd}} = \frac{\overrightarrow{E_{meas,gnd}}}{\overrightarrow{H_{meas,air}}} \cdot \overrightarrow{f(\omega)} = \frac{\overrightarrow{R^{e'}} \cdot \overrightarrow{G^{ee}_{meas}}}{\overrightarrow{R^{H'}} \cdot \overrightarrow{G^{he}_{meas}}} \cdot \frac{\overrightarrow{R^{H'}}}{\overrightarrow{R^{e'}}} = \frac{\overrightarrow{G^{ee}_{meas}}}{\overrightarrow{G^{he}_{meas}}}. \qquad (5)$$

* * * * *